(12) United States Patent
Kobana et al.

(10) Patent No.: US 8,977,435 B2
(45) Date of Patent: Mar. 10, 2015

(54) VEHICLE CONTROL APPARATUS

(75) Inventors: Masumi Kobana, Fuji (JP); Kazuya Sasaki, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/988,872

(22) PCT Filed: Feb. 3, 2011

(86) PCT No.: PCT/JP2011/052289
§ 371 (c)(1),
(2), (4) Date: May 22, 2013

(87) PCT Pub. No.: WO2012/105030
PCT Pub. Date: Aug. 9, 2012

(65) Prior Publication Data
US 2013/0311043 A1 Nov. 21, 2013

(51) Int. Cl.
*A01B 69/00* (2006.01)
*B60T 7/12* (2006.01)
*B60J 7/22* (2006.01)
*B60T 7/18* (2006.01)
*B62D 15/02* (2006.01)
*B60K 28/06* (2006.01)
*B60W 10/18* (2012.01)
*B60W 10/20* (2006.01)
*B60W 30/00* (2006.01)

(52) U.S. Cl.
CPC .... *B60T 7/12* (2013.01); *B60J 7/22* (2013.01); *B60T 7/18* (2013.01); *B62D 15/0265* (2013.01); *B60K 28/06* (2013.01); *B60W 2540/26* (2013.01); *B60W 10/18* (2013.01); *B60W 10/20* (2013.01); *B60W 30/00* (2013.01); *B62D 15/025* (2013.01)
USPC ......................................................... 701/41

(58) Field of Classification Search
USPC ...................... 701/1, 36, 41, 70, 99, 300, 301
See application file for complete search history.

(56) References Cited

FOREIGN PATENT DOCUMENTS

| JP | U-2-59026 | 4/1990 | | |
|---|---|---|---|---|
| JP | A-7-76235 | 3/1995 | | |
| JP | A-10-293899 | 11/1998 | | |
| JP | A-2003-63373 | 3/2003 | | |
| JP | A-2003-118424 | 4/2003 | | |
| JP | A-2005-297621 | 10/2005 | | |
| JP | A-2005-316889 | 11/2005 | | |
| JP | A-2006-248361 | 9/2006 | | |
| JP | 2007-331652 | * | 12/2007 | ............... B60T 7/14 |
| JP | A-2007-331652 | | 12/2007 | |
| JP | A-2009-163434 | | 7/2009 | |
| JP | A-2010-95189 | | 4/2010 | |

* cited by examiner

*Primary Examiner* — Kim T Nguyen
(74) *Attorney, Agent, or Firm* — Oliff PLC

(57) ABSTRACT

A determination processing ECU of a vehicle control apparatus which stops a vehicle regardless of whether a driver operates a brake pedal operation stops the vehicle while changing the steering angle of the vehicle based on an environment surrounding a vehicle stop position.

3 Claims, 7 Drawing Sheets

VEHICLE CONTROL APPARATUS

The present invention relates to a vehicle control apparatus, and more particularly, to a vehicle control apparatus that stops a vehicle regardless of whether a driver operates a brake pedal.

BACKGROUND ART

An apparatus has been proposed which stops the vehicle according to the state of the driver. For example, Patent Literature 1 discloses a vehicle including an automatic brake control device. The vehicle detects, for example, drowsiness or seizure on the basis of a change in the pulse of the driver and stops regardless of whether a brake operation is performed or not when drowsiness or seizure is detected or when the driver operates a physical abnormality detection switch.

CITATION LIST

Patent Literature

[Patent Literature 1] Japanese Unexamined Patent Application Publication No. 7-76235

SUMMARY OF INVENTION

Technical Problem

However, the above-mentioned technique does not disclose a detailed vehicle stop position in case of emergency and needs to be improved.

The invention has been made in view of the above-mentioned problems and an object of the invention is to provide a vehicle control apparatus capable of stopping the vehicle at an appropriate position.

Solution to Problem

According to a first aspect of the invention, there is provided a vehicle control apparatus including an emergency stop unit that stops a vehicle, regardless of whether a driver operates a brake pedal. The emergency stop unit stops the vehicle while changing a steering angle of the vehicle based on an environment surrounding a vehicle stop position.

According to this structure, the emergency stop unit which stops the vehicle regardless of whether the driver operates the brake pedal stops the vehicle while changing the steering angle of the vehicle based on the environment surrounding the vehicle stop position. Therefore, it is possible to stop the vehicle at an appropriate position or in an appropriate direction based on the environment surrounding the vehicle stop position.

According to a second aspect of the invention, there is provided a vehicle control apparatus including an emergency stop unit that stops a vehicle, regardless of whether a driver operates a brake pedal. The emergency stop unit stops the vehicle at a position before or after a predetermined position according to a speed of the vehicle.

According to this structure, the emergency stop unit which stops the vehicle regardless of whether the driver operates the brake pedal stops the vehicle at the position before or after the predetermined position according to the speed of the vehicle. Therefore, it is possible to stop the vehicle at an appropriate position other than a predetermined position, such as an intersection or a crossing, according to the speed of the vehicle, without applying a load to the driver.

According to a third aspect of the invention, there is provided a vehicle control apparatus including an emergency stop unit that stops a vehicle, regardless of whether a driver operates a brake pedal. The emergency stop unit stops the vehicle at a position which is determined on the basis of a plurality of environmental conditions around a vehicle stop position.

According to this structure, the emergency stop unit which stops the vehicle regardless of whether the driver operates the brake pedal stops the vehicle at the position which is determined on the basis of the plurality of environmental conditions around the vehicle stop position. Therefore, it is possible to stop the vehicle at the appropriate position according to the width of the road or whether there is a following vehicle and an oncoming vehicle, regardless of whether the driver operates the brake pedal.

In this case, the emergency stop unit may stop the vehicle on the basis of a stop switch operation of the driver, a sound instruction of the driver, and biometric information of the driver.

According to this structure, the emergency stop unit stops the vehicle on the basis of the stop switch operation of the driver, the instruction of the driver with the sound, and the biometric information of the driver. Therefore, it is possible to stop the vehicle at an appropriate position when the health conditions of the driver are worsened.

In this case, the emergency stop unit may maintain the stopped state of the vehicle when the driver does not perform a dedicated operation to cancel the vehicle stop operation.

According to this structure, the emergency stop unit maintains the stopped state of the vehicle when the driver does not perform the dedicated operation to cancel the vehicle stop operation. Therefore, it is possible to prevent overriding due to an operation error when the health conditions of the driver are worsened.

The emergency stop unit may stop the vehicle at a position in a lane in which the vehicle travels.

According to this structure, the emergency stop unit stops the vehicle at a position in the lane in which the vehicle travels. Therefore, it is possible to prevent a reduction in safety due to a lane change or the stop of the vehicle at the road shoulder. In addition, it is possible to omit a calculation process to which a calculation load is applied, such as the recognition of the road shoulder and other lanes, a lane change to another lane, or the stop of the vehicle at the road shoulder. Therefore, it is possible to increase the speed of the calculation process and simplify the structure of an apparatus.

In a case in which a width of the lane in which the vehicle travels is equal to or greater than a predetermined value, when the vehicle travels in a lane furthest from an opposite lane, the emergency stop unit may stop the vehicle at a position which is away from the opposite lane in the lane. When the vehicle travels in a lane closest to the opposite lane, the emergency stop unit may stop the vehicle at a position which is close to the opposite lane in the lane. When the vehicle travels in a lane other than the lane furthest from the opposite lane and the lane closest to the opposite lane, the emergency stop unit may stop the vehicle at the center of the lane. In a case in which the width of the lane in which the vehicle travels is less than the predetermined value, when the vehicle travels in a lane other than the lane closest to the opposite lane, the emergency stop unit may stop the vehicle at a position which is close to the opposite lane in the lane. When the vehicle travels in the lane closest to the opposite lane, the emergency stop unit may stop the vehicle at a position which is away from the opposite lane in the lane.

According to this structure, in the case in which the width of the lane in which the vehicle travels is equal to or greater than the predetermined value, when the vehicle travels in the lane furthest from the opposite lane, the emergency stop unit stops the vehicle at the position which is away from the opposite lane in the lane. When the vehicle travels in the lane closest to the opposite lane, the emergency stop unit stops the vehicle at the position which is close to the opposite lane in the lane. When the vehicle travels in the lane other than the lane furthest from the opposite lane and the lane closest to the opposite lane, the emergency stop unit stops the vehicle at the center of the lane. Therefore, it is easy for the following vehicle to avoid the host vehicle in the same lane and it is possible to improve safety.

In the case in which the width of the lane in which the vehicle travels is less than the predetermined value, when the vehicle travels in the lane other than the lane closest to the opposite lane, the emergency stop unit stops the vehicle at the position which is close to the opposite lane in the lane. In this way, even when the width of the lane is small, it is easy for the following vehicle to avoid the host vehicle from the side which is away from the opposite lane and has high safety, and it is possible to improve safety. In addition, when the vehicle travels in the lane closest to the opposite lane, the emergency stop unit stops the vehicle at a position which is away from the opposite lane in the lane. In this way, the following vehicle can avoid the host vehicle from the side which is away from the opposite lane and has high safety, and it is possible to reduce the possibility of the contact between the oncoming vehicle and the host vehicle in a narrow lane.

The emergency stop unit may stop the vehicle using a traveling pattern which is selected from a plurality of prepared traveling patterns.

According to this structure, the emergency stop unit stops the vehicle using the traveling pattern which is selected from the plurality of prepared traveling patterns. Therefore, the emergency stop unit does not need to generate a new traveling pattern for steering or deceleration. As a result, it is possible to omit a calculation process to which a calculation load is applied. It is possible to increase the speed of the calculation process and simplify the structure of an apparatus.

Advantageous Effects of Invention

According to the vehicle control apparatus of the invention, it is possible to stop the vehicle at an appropriate position.

BRIEF DESCRIPTION OF DRAWINGS

FIG. 3 is a diagram illustrating a deceleration pattern in which a jerk is changed at a deceleration start position corresponding to the position where a stop switch is turned on.

FIG. 4 is a diagram illustrating a deceleration pattern in which a deceleration start time is changed at the deceleration start position corresponding to the position where the stop switch is turned on.

DESCRIPTION OF EMBODIMENTS

Figure 1:
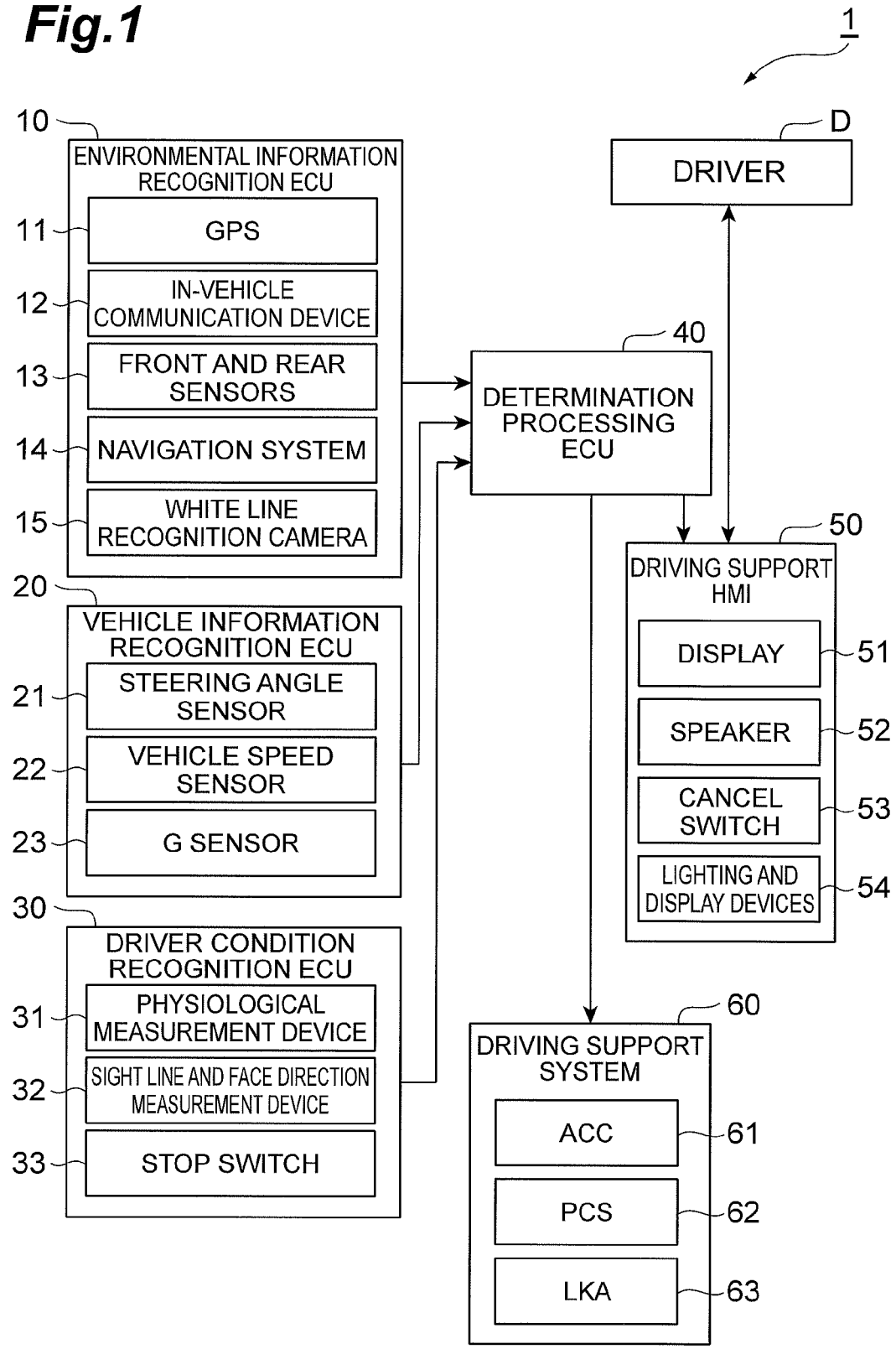
FIG. 1 is a block diagram illustrating the structure of a vehicle control apparatus according to an embodiment.

Hereinafter, a vehicle control apparatus according to an embodiment of the invention will be described with reference to the accompanying drawings. A vehicle control apparatus 1 according to this embodiment shown in FIG. 1 is provided in a host vehicle and urgently stops the host vehicle on the basis of the operation of a stop switch 33 by a driver D and the detected biometric information of the driver D. As shown in FIG. 1, the vehicle control apparatus 1 includes an environmental information recognition ECU 10, a vehicle information recognition ECU 20, a driver condition recognition ECU 30, a determination processing ECU 40, a driving support HMI 50, and a driving support system 60.

The environmental information recognition ECU 10 includes a GPS 11, an in-vehicle communication device 12, front and rear sensors 13, a navigation system 14, and a white line recognition camera 15. The GPS (Global Positioning System) 11 receives signals from a plurality of GPS satellites using a GPS receiver and measures the position of the host vehicle from the difference between the signals. The in-vehicle communication device 12 is a communication device which performs vehicle-to-vehicle communication with other vehicles and road-to-vehicle communication with a road-side infrastructure such as an optical beacon. The front and rear sensors 13 are, for example, millimeter-wave radars or ultrasonic sonars that detect the position and moving speed of pedestrians, two-wheeled vehicles, bicycles, and vehicles around the vehicle, and road-side facilities such as stores. The navigation system 14 guides the route of the host vehicle using the GPS 11 and a map information DB (Database) (not shown) that is provided in the host vehicle and stores map information. The white line recognition camera 15 recognizes the white line of the lane in which the host vehicle travels.

The vehicle information recognition ECU 20 includes a steering angle sensor 21, a vehicle speed sensor 22, and a G sensor 23. The steering angle sensor 21 detects the steering angle of the host vehicle. The vehicle speed sensor 22 detects the rotation speed of an axle to detect the speed of the host vehicle. The G sensor 23 detects the acceleration of the host vehicle in the traveling direction and the lateral direction.

The driver condition recognition ECU 30 includes a physiological measurement device 31, a sight line and face direction measurement device 32, and a stop switch 33. The physiological measurement device 31 detects biometric information, such as the brain wave, pulse, breathing, blood pressure, and myoelectricity of the driver D, to detect, for example, the heart attack of the driver D. The sight line and face direction measurement device 32 captures the image of the head of the driver D using a camera and detects the movement of the eyes or face, thereby detecting the sight line and face direction of the driver D. The stop switch 33 is used by the driver D to urgently stop the host vehicle.

The determination processing ECU 40 controls the deceleration or steering of the host vehicle on the basis of, for example, the condition of the driver D, an environment around the position where the host vehicle is stopped, and the specifications of the host vehicle.

The driving support HMI (Human Interface) 50 notifies the driver D that the system of the vehicle control apparatus 1 urgently stops the host vehicle by displaying an image on the display 51, outputting a sound from a speaker 52, or using lighting and display devices 54, on the basis of command signals from the determination processing ECU 40. In addition, the driving support HMI 50 includes a cancel switch 53 that is used by the driver D to permit the overriding of a control operation of urgently stopping the host vehicle.

The driving support system 60 drives, for example, an accelerator actuator, a brake actuator, and a steering actuator (not shown) on the basis of the command signals from the determination processing ECU 40 to control the traveling of the host vehicle. The driving support system 60 includes an ACC (Adaptive Cruse Control) 61, a PCS (Pre-Crush safety) 62, and an LKA (Lane Keeping Assist) 63. The ACC 61 is used to control the host vehicle such that the host vehicle follows the vehicle in front at a predetermined speed and a predetermined inter-vehicle distance. The PCS 62 performs a control operation for preventing the contact with an obstacle or reducing damage when the vehicle contacts the obstacle. The LKA 63 performs control such that the host vehicle travels while keeping the lane.

Figure 2:
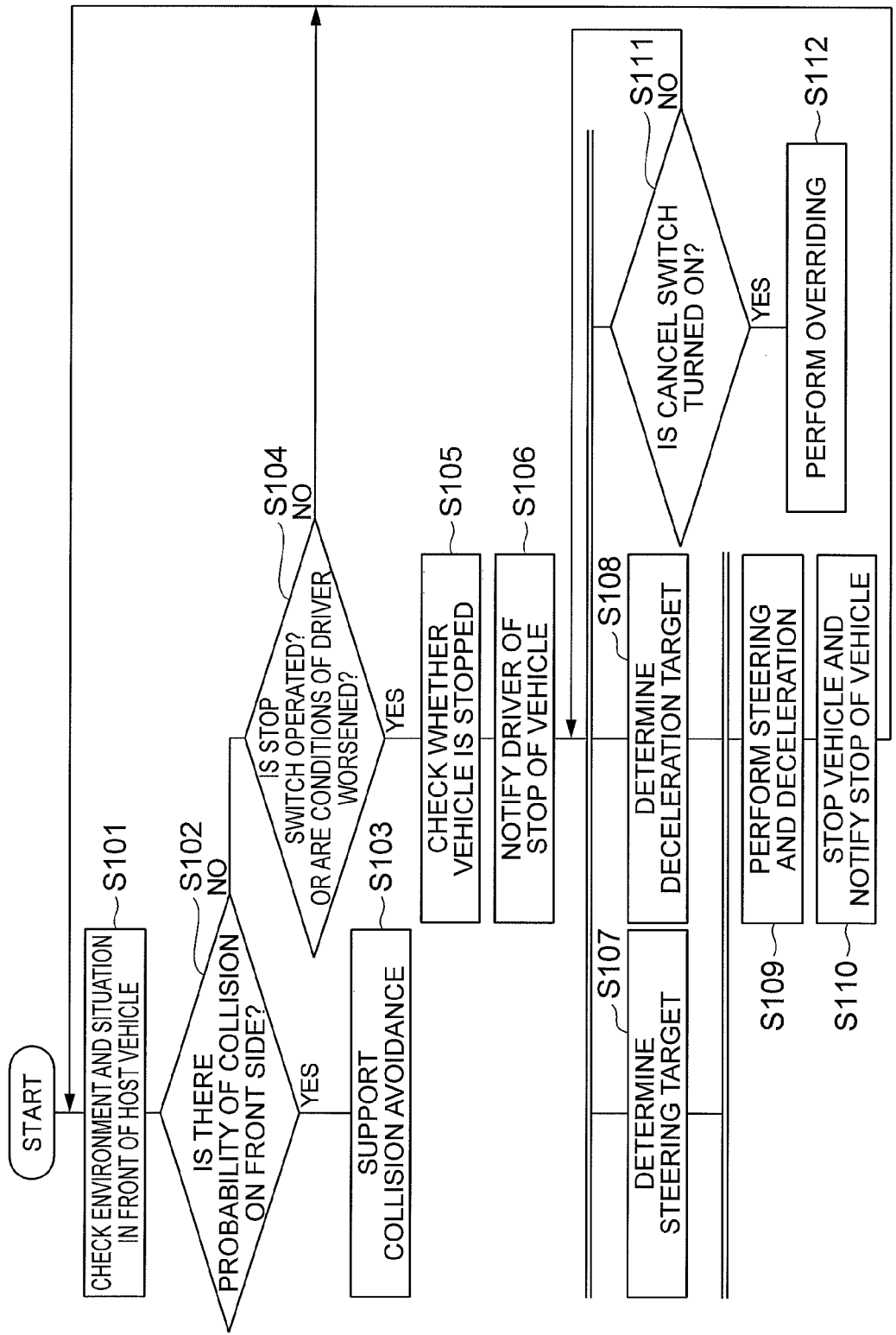
FIG. 2 is a flowchart illustrating the operation of the vehicle control apparatus according to the embodiment.

Next, the operation of the vehicle control apparatus 1 according to this embodiment will be described with reference to the flowchart shown in FIG. 2. As shown in FIG. 2, the environmental information recognition ECU 10 of the vehicle control apparatus 1 checks an environment in front of the host vehicle. The vehicle information recognition ECU 20 checks the state of the host vehicle. The driver condition recognition ECU 30 checks the condition of the driver D (S101). When it is determined that there is the possibility of collision occurring on the front side on the basis of the information obtained by the environmental information recognition ECU 10 (S102), the determination processing ECU 40 of the vehicle control apparatus 1 operates the driving support HMI 50 and the driving system 60 to support collision avoidance (S103).

As a trigger for the start of stop support, when the stop switch 33 is operated by the driver D or when the driver condition recognition ECU 30 detects that the condition of the driver is worsened (S104), the determination processing ECU 40 checks whether the host vehicle is actually stopped on the basis of the information from the vehicle information recognition ECU 20 (S105). When the host vehicle is traveling, the determination processing ECU 40 notifies the driver D of information indicating the emergency stop of the host vehicle and the progress of the stop process using the driving support HMI 50 (S106). In addition, the determination processing ECU 40 notifies vehicles or apparatuses outside the host vehicle of information indicating the emergency stop of the host vehicle and the progress of the stop process using the in-vehicle communication device 12. In this embodiment, control is performed to stop the host vehicle, regardless of whether there is a vehicle in front of the host vehicle.

Figure 3:
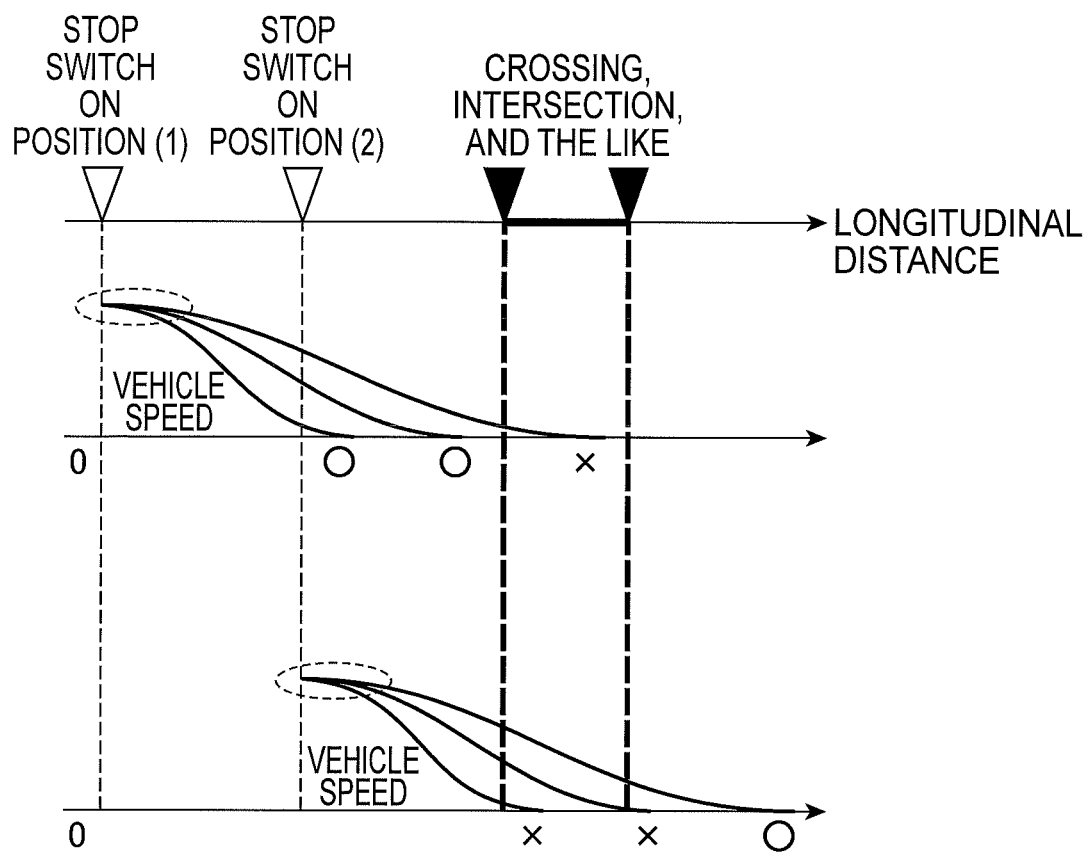
Figure 4:
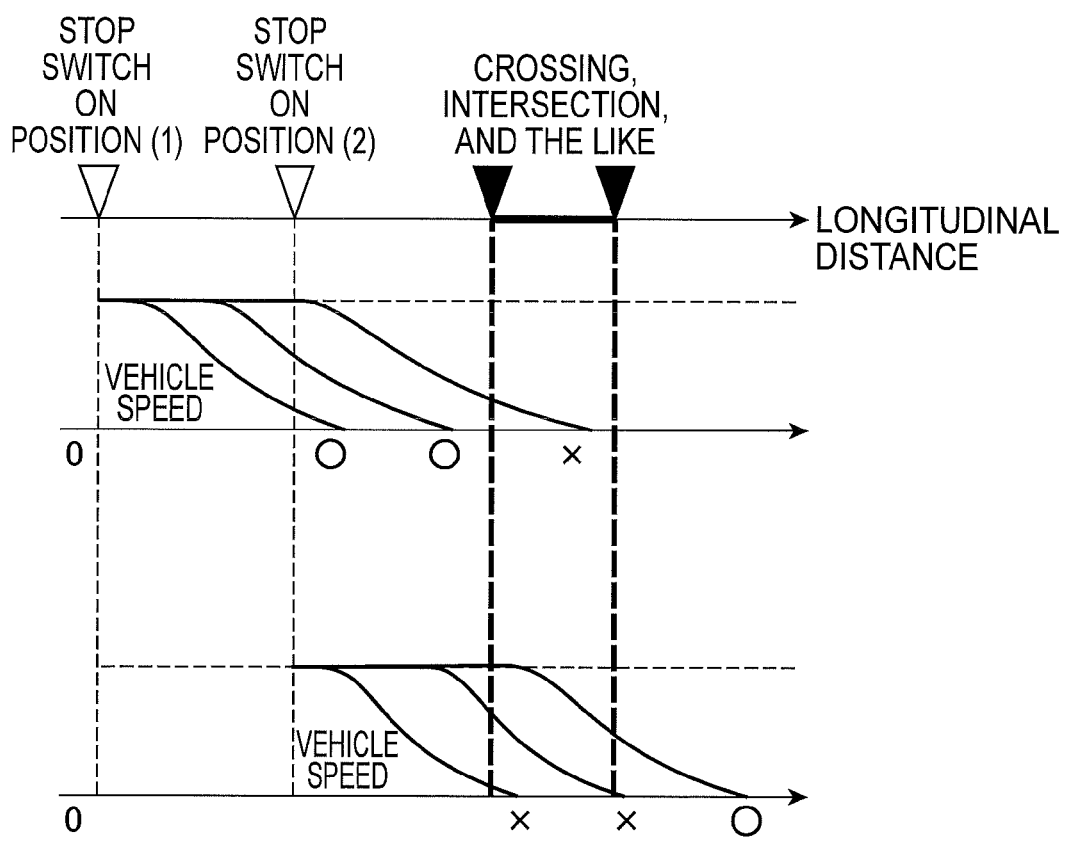
Figure 5:
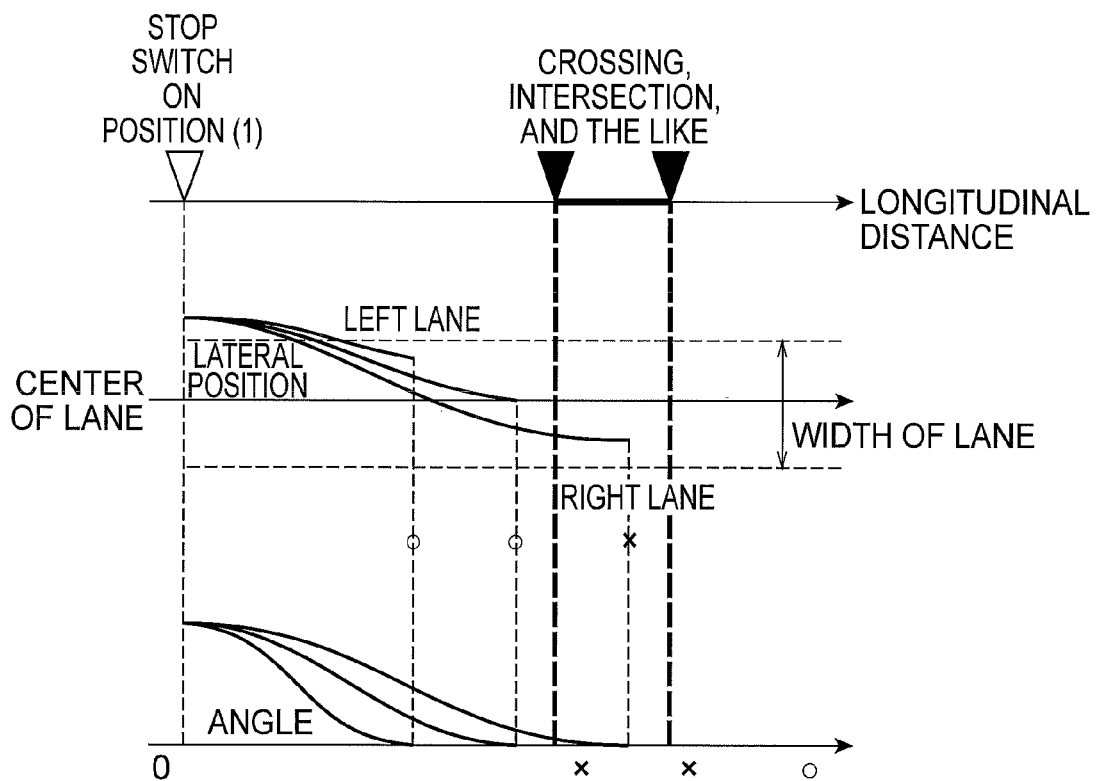
FIG. 5 is a diagram illustrating a steering pattern in which a steering angle is changed.

The determination processing ECU 40 determines a steering target (S107) and determines a deceleration target (S108). As shown in FIG. 3, a traveling pattern in which there are three kinds of rates of change in deceleration at the same operation position (the position where the worsening of the condition of the driver D is detected) of the stop switch 33 is prepared in the determination processing ECU 40. In addition, as shown in FIG. 4, a traveling pattern in which there are three kinds of deceleration start times at the same operation position of the stop switch 33 is prepared in the determination processing ECU 40. As shown in FIG. 5, a traveling pattern in which there are three kinds of changes in steering angle at the same operation position of the stop switch 33 is prepared in the determination processing ECU 40. The determination processing ECU 40 selects the traveling pattern to be executed from these traveling patterns.

The determination processing ECU 40 determines whether "to stop the vehicle in front of a predetermined place", such as a rail crossing or an intersection, or "to inevitably enter the place", on the basis of the situation in front of the vehicle which is obtained by the environmental information recognition ECU 10. As the determination method, for example, W is weighted in descending order of the risk, on the basis of the information obtained from the in-vehicle communication device 12 or the navigation system 14 of the environmental information recognition ECU 10:

$W=\{$a rail crossing, an intersection, a crossing, an entrance, a narrow road, a junction, a branch, a no-go area, a no-stopping area, ... $\}$.

Damage Lv is calculated from the weights and information obtained from, for example, the front and rear sensors 13, as follows:

Damage $Lv$=the probability of occurrence of collision (moving range)×frequency×impact (weight× size)×the time for which the probability of collision is continuously detected.

The trade-off E is calculated as follows:

$E=W\cdot Lv>E$th.

When the trade-off E is greater than a predetermined threshold value Eth, the determination processing ECU 40 selects "to stop the vehicle in front of the predetermined place".

However, it is assumed that, when circulatory system abnormalities occur in the driver D due to, for example, the rupture of an aneurysm, the condition of the driver D is worsened by impact caused when the vehicle is stopped, on the basis of the value detected by the physiological measurement device 31. The determination processing ECU 40 reduces deceleration or the degree of change in the steering angle, depending on the degree of seriousness of the driver D. For example, even in a situation in which "to stop the vehicle in front of the predetermined place" is selected on the basis of only the information from the environmental information recognition ECU 10, when the degree of seriousness of the driver D is high, the determination processing ECU 40 selects "to inevitably enter the place".

Since the traveling locus of the host vehicle is changed by the control operation of stopping the host vehicle, a new risk does not occur. However, the determination processing ECU 40 increases the number of detection targets in front of the host vehicle. When there is a new target and it is difficult to avoid collision on the basis of TTC (Time To Collision), the determination processing ECU 40 performs collision avoidance. In the other cases, a deceleration and steering method is determined by the above-mentioned determination expression. When E=W·Lv>Eth is established, the determination processing ECU 40 selects "to stop the vehicle in front of the predetermined place". In this case, when rapid deceleration is needed, the determination processing ECU 40 adjusts the rate of change in deceleration and the deceleration start time in the prepared traveling patterns, considering the following vehicle.

When it is necessary to consider the following vehicle and $\{P, S, I\}>$th$\{P, S, I\}$ is satisfied from the information obtained from the rear sensor of the front and rear sensors 13 (where th$\{P, S, I\}$ is a predetermined threshold value, P is a physical position/speed relationship, such as TG (Time Gap) and TTC, S is a state related to a reaction time, such as the face direction of the driver of the following vehicle, fatigue, whether there is an operation other than driving, and age, and I is impact, such as the weight or size of the following vehicle), the determination processing ECU 40 reduces the rate of change in deceleration and delays the deceleration start time.

When the following vehicle avoids the host vehicle which is in the stopped state, it is likely to risk safety depending on the stop position. Therefore, the determination processing ECU 40 adjusts the posture or lateral location of the host vehicle in the lane according to a road environment such that it is easy for the following vehicle to change the lane or to avoid the host vehicle in the lane.

Figure 6:
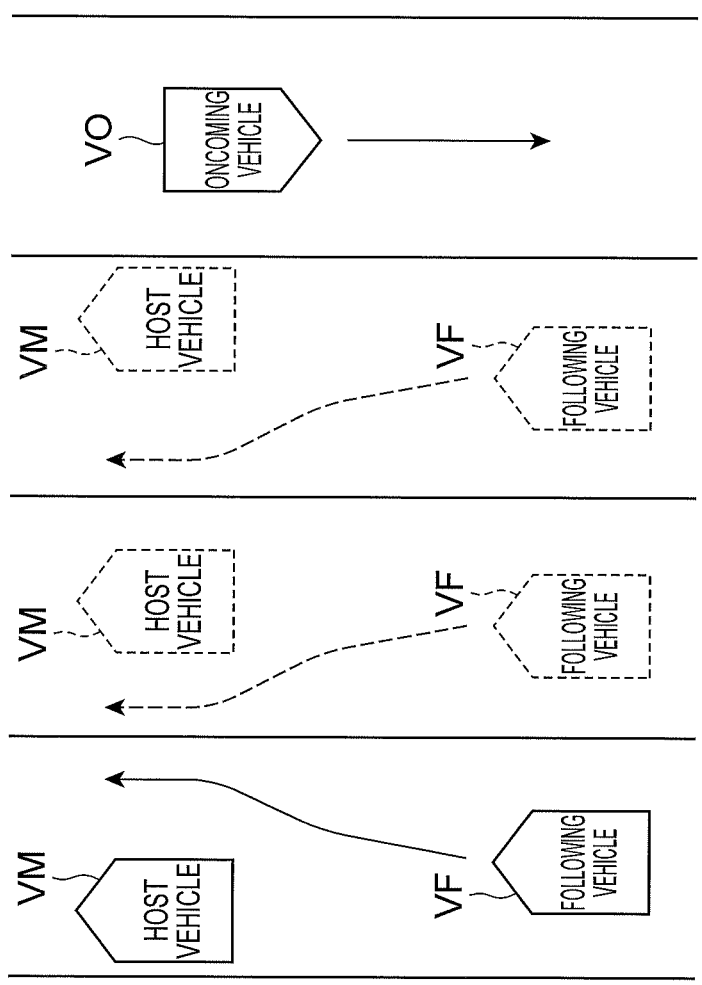
FIG. 6 is a plan view illustrating a stop position in each lane on the road with a large lane width.

As shown in FIG. 6, when there are a plurality of lanes on one side and the width of the lane is large, the determination processing ECU 40 adjusts the posture or lateral location such that it is easy for the a following vehicle VF to avoid a host vehicle VM in the lane since the lane change of the following vehicle VF risks safety. For example, as shown in FIG. 6, when the host vehicle VM travels in the lane (left lane) furthest from the opposite lane in which an oncoming vehicle VO travels, the determination processing ECU 40 stops the host vehicle VM on the left side of the lane which is away from the opposite lane. When the host vehicle VM travels in the lane (right lane) closest to the opposite lane, the determination processing ECU 40 stops the host vehicle VM on the right side of the lane which is close to the opposite lane. When the host vehicle VM travels in the lane other than the lane furthest from the opposite lane and the lane closest to the opposite lane, the determination processing ECU 40 stops the host vehicle VM at the center of the lane.

However, in a case in which the width of the lane in which the host vehicle VM travels is less than a predetermined value, when a difference in speed between the lanes is large, when the lane furthest from the opposite lane has a side stripe, or when there is no median strip between the lane and the opposite lane, the following vehicle VF needs to change the lane to the side away from the opposite lane for safety. Therefore, when the host vehicle travels in the lane other than the lane (right lane) closest to the opposite lane, the determination processing ECU 40 stops the host vehicle VM on the right side of the lane close to the opposite lane. When the host vehicle VM travels in the lane closest to the opposite lane, the determination processing ECU 40 stops the host vehicle VM on the left side of the lane away from the opposite lane.

Figure 7:
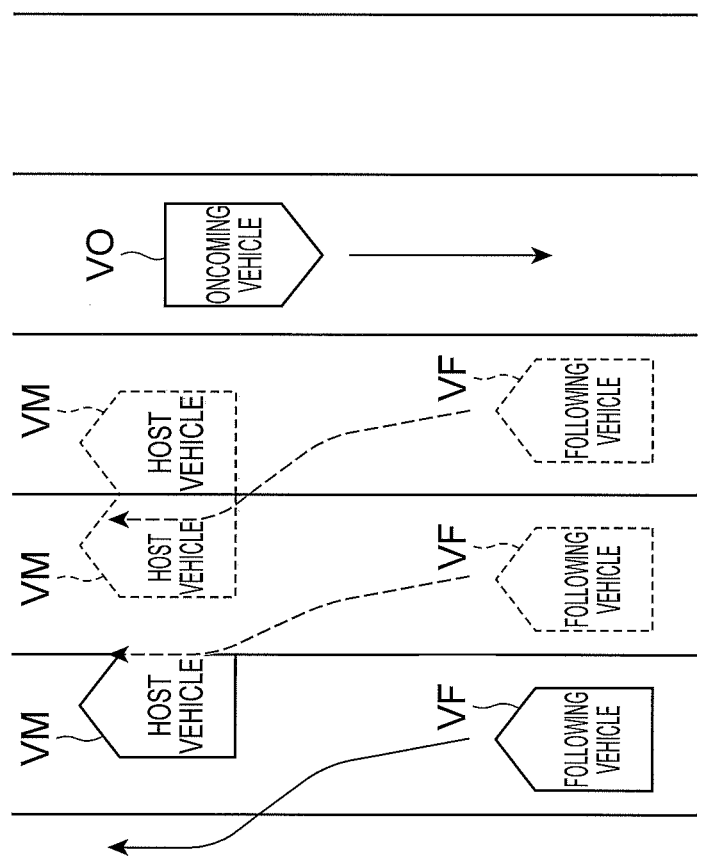
FIG. 7 is a plan view illustrating the stop position in each lane on the road with a small lane width.

In the above-mentioned process, the determination processing ECU 40 stops the host vehicle VM inside the white line, which partitions the lanes, in the same lane. In the example shown in FIGS. 6 and 7, the country, such as Japan where the drivers keep to the left side of the road, is exemplified. However, in the country, such as U.S.A. where the drivers keep to the right side of the road, the left and right are reversed. Returning to FIG. 2, the determination processing ECU 40 operates the driving support system 60 on the basis of the determined steering target and deceleration target to steer and decelerate the vehicle (S109). After the vehicle is stopped, the determination processing ECU 40 turns on the parking brake of the host vehicle VM and maintains the stopped state until help arrives. In addition, the determination processing ECU 40 notifies the neighbors of the emergency stop of the host vehicle VM using the in-vehicle communication device 12 (S110).

Until the driver D operates the cancel switch 53 (S111), the determination processing ECU 40 does not permit the driver D to perform overriding during the control operation of stopping the host vehicle VM (S112).

According to this embodiment, the determination processing ECU 40 of the vehicle control apparatus 1 which stops the vehicle regardless of whether the driver D operates the brake pedal stops the vehicle while changing the steering angle of the vehicle based on the environment surrounding the vehicle stop position. Therefore, it is possible to stop the vehicle at an appropriate position or in an appropriate direction based on the environment surrounding the vehicle stop position.

According to this embodiment, the determination processing ECU 40 which stops the vehicle regardless of whether the driver D operates the brake pedal stops the vehicle at a position before or after a predetermined position according to the speed of the vehicle. Therefore, it is possible to stop the vehicle at a position other than a predetermined position, such as an intersection or a crossing, according to the speed of the vehicle, without applying a load to the driver D.

According to this embodiment, the determination processing ECU 40 which stops the vehicle regardless whether the driver D operates the brake pedal operation stops the vehicle at the position which is determined on the basis of a plurality of environmental conditions around the vehicle stop position. Therefore, it is possible to stop the vehicle at an appropriate position according to, for example, the width of the road or whether there is a following vehicle and an oncoming vehicle.

According to this embodiment, the determination processing ECU 40 stops the vehicle on the basis of the operation of the stop switch 33 by the driver D other than the brake pedal operation, the sound instruction of the driver D, and the biometric information of the driver D. Therefore, it is possible to stop the vehicle at an appropriate position when the health conditions of the driver are worsened.

According to this embodiment, the determination processing ECU 40 maintains the stopped state of the vehicle when the driver D does not operate the cancel switch 53 to cancel the operation of stopping the vehicle. Therefore, it is possible to prevent overriding due to an operation error when the health conditions of the driver D are worsened.

According to this embodiment, the determination processing ECU 40 stops the vehicle in the lane in which the vehicle is traveling. Therefore, it is possible to prevent a reduction in safety due to a lane change or the stop of the vehicle at a road shoulder. In addition, it is possible to omit a calculation process to which a calculation load is applied, such as the recognition of the road shoulder and other lanes, a lane change to another lane, or the stop of the vehicle at the road shoulder. Therefore, it is possible to increase the speed of the calculation process and simplify the structure of an apparatus.

According to this embodiment, in a case in which the width of the lane in which the vehicle travels is equal to or greater than a predetermined value, when the vehicle travels in the lane furthest from the opposite lane, the determination processing ECU 40 stops the vehicle at a position that is away from the opposite lane in the lane. When the vehicle travels in the lane closest to the opposite lane, the determination processing ECU 40 stops the vehicle at a position that is close to the opposite lane in the lane. When the vehicle travels in a lane other than the lane furthest from the opposite lane and the lane closest to the opposite lane, the determination processing ECU 40 stops the vehicle at the center of the lane. Therefore, it is easy for the following vehicle to avoid the host vehicle in the same lane and it is possible to improve safety.

In a case in which the width of the lane in which the vehicle travels is less than the predetermined value, when the vehicle travels in the lane other than the lane closest to the opposite lane, the determination processing ECU 40 stops the vehicle at a position which is close to the opposite lane in the lane. In this way, even when the width of the lane is small, it is easy for the following vehicle to avoid the host vehicle from the side which is away from the opposite lane and has high safety, and it is possible to improve safety. In addition, when the vehicle travels in the lane closest to the opposite lane, the determination processing ECU 40 stops the vehicle at a position which is away from the opposite lane in the lane. In this way, the following vehicle can avoid the host vehicle from the side which is away from the opposite lane and has high safety, and it is possible to reduce the possibility of the contact between the oncoming vehicle and the host vehicle in a narrow lane.

According to this embodiment, the determination processing ECU 40 stops the vehicle using the traveling pattern selected from a plurality of prepared traveling patterns. Therefore, the determination processing ECU 40 does not need to generate a new traveling pattern for steering or deceleration. As a result, it is possible to omit a calculation process to which a calculation load is applied. It is possible to increase the speed of the calculation process and simplify the structure of an apparatus.

The embodiment of the invention has been described above. However, the invention is not limited to the above-described embodiment, but various modifications and changes of the invention can be made.

INDUSTRIAL APPLICABILITY

According to the vehicle control apparatus of the invention, it is possible to stop the vehicle at an appropriate position.

REFERENCE SIGNS LIST

1: VEHICLE CONTROL APPARATUS
10: ENVIRONMENTAL INFORMATION RECOGNITION ECU
11: GPS
12: IN-VEHICLE COMMUNICATION DEVICE
13: FRONT AND REAR SENSORS
14: NAVIGATION SYSTEM
15: WHITE LINE RECOGNITION CAMERA
20: VEHICLE INFORMATION RECOGNITION ECU
21: STEERING ANGLE SENSOR
22: VEHICLE SPEED SENSOR
23: G SENSOR
30: DRIVER CONDITION RECOGNITION ECU
31: PHYSIOLOGICAL MEASUREMENT DEVICE
32: SIGHT LINE AND FACE DIRECTION MEASUREMENT DEVICE
33: STOP SWITCH
40: DETERMINATION PROCESSING ECU
50: DRIVING SUPPORT HMI
51: DISPLAY
52: SPEAKER
53: CANCEL SWITCH
54: LIGHTING AND DISPLAY DEVICES
60: DRIVING SUPPORT SYSTEM
61: ACC
62: PCS
63: LKA

The invention claimed is:

1. A vehicle control apparatus comprising:
a driver condition detecting unit that detects a condition of a driver;
a stop switch that is operated by the driver; and
an emergency stop unit that stops a vehicle, regardless of whether the driver operates a brake pedal,
wherein, when the driver condition detecting unit detects that the condition of the driver is worsened, the emergency stop unit stops the vehicle while changing a steering angle of the vehicle based on an environment surrounding a vehicle stop position, and
when the driver operates the stop switch, the emergency stop unit stops the vehicle while changing the steering angle of the vehicle according to the environment around the vehicle stop position, regardless of the condition of the driver detected by the driver condition detecting unit,
wherein, in a case in which a width of a lane in which the vehicle travels is equal to or greater than a predetermined value, when the vehicle travels in a lane furthest from an opposite lane, the emergency stop unit stops the vehicle at a position which is away from the opposite lane in the lane,
when the vehicle travels in a lane closest to the opposite lane, the emergency stop unit stops the vehicle at a position which is close to the opposite lane in the lane, and
when the vehicle travels in a lane other than the lane furthest from an opposite lane and the lane closest to the opposite lane, the emergency stop unit stops the vehicle at the center of the lane, and
in a case in which the width of the lane in which the vehicle travels is less than the predetermined value, when the vehicle travels in a lane other than the lane closest to the opposite lane, the emergency stop unit stops the vehicle at the position which is close to the opposite lane in the lane, and
when the vehicle travels in a lane closest to the opposite lane, the emergency stop unit stops the vehicle at the position which is away from the opposite lane in the lane.

2. The vehicle control apparatus according to claim 1,
wherein the emergency stop unit maintains the stopped state of the vehicle when the driver does not perform a dedicated operation to cancel the vehicle stop operation.

3. The vehicle control apparatus according to claim 1,
wherein the emergency stop unit stops the vehicle using a traveling pattern which is selected from a plurality of prepared traveling patterns.

* * * * *